(12) United States Patent
Fattal et al.

(10) Patent No.: US 8,390,800 B2
(45) Date of Patent: Mar. 5, 2013

(54) ANGLE SENSOR, SYSTEM AND METHOD EMPLOYING GUIDED-MODE RESONANCE

(75) Inventors: David A. Fattal, Mountain View, CA (US); Anna Pyayt, Seattle, WA (US); Raymond G. Beausoleil, Redmond, WA (US); Wei Wu, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 356 days.

(21) Appl. No.: 12/864,234

(22) PCT Filed: Mar. 4, 2008

(86) PCT No.: PCT/US2008/055833
§ 371 (c)(1),
(2), (4) Date: Jul. 22, 2010

(87) PCT Pub. No.: WO2009/110892
PCT Pub. Date: Sep. 11, 2009

(65) Prior Publication Data
US 2010/0309459 A1    Dec. 9, 2010

(51) Int. Cl.
*G01B 11/26* (2006.01)
*G01C 1/00* (2006.01)
*G01J 3/28* (2006.01)

(52) U.S. Cl. ........................................ 356/138; 356/328

(58) Field of Classification Search .................. 356/138, 356/305, 328
See application file for complete search history.

(56) References Cited

U.S. PATENT DOCUMENTS

| 5,110,210 A | 5/1992 | Fay et al. |
| 5,216,680 A | 6/1993 | Magnusson |
| 5,598,300 A | 1/1997 | Magnusson |
| 6,785,433 B2 * | 8/2004 | Tiefenthaler ............... 385/12 |
| 7,167,615 B1 | 1/2007 | Wawro |
| 2006/0193550 A1 | 8/2006 | Wawro |
| 2007/0202543 A1 * | 8/2007 | Gollier et al. ............... 435/7.1 |

FOREIGN PATENT DOCUMENTS

| JP | 2005-038735 | 2/2005 |
| JP | 2005-056618 | 3/2005 |

(Continued)

OTHER PUBLICATIONS

Anne-Laure Fehrenbach et al., "Experimental demonstration of a narrowband, angular tolerant, polarization independent, doubly periodic resonant grating filter," Optics Letters, vol. 32, No. 15, Aug. 1, 2007, pp. 2269-2271.

(Continued)

*Primary Examiner* — Layla Lauchman
*Assistant Examiner* — Hina F Ayub

(57) ABSTRACT

An angle sensor, system and method employ a guided-mode resonance. The angle sensor includes a guided-mode resonance (GMR) grating and a resonance processor. The resonance processor determines an angle of incidence of a signal incident on the GMR grating. The resonance processor uses a guided-mode resonance response of the GMR grating to the signal to determine the angle of incidence. The angle sensing system includes the GMR grating, the resonance processor and further includes an optical source that produces the signal. The method includes providing a GMR grating, detecting a guided-mode resonance produced in the GMR grating when subjected to an incident signal, and determining an angle of incidence of the incident signal from one or both of a number of and a spectral distance between guided-mode resonances present in a response of the GMR grating to the incident signal.

19 Claims, 3 Drawing Sheets

FOREIGN PATENT DOCUMENTS

| | | |
|---|---|---|
| JP | 2005-106627 | 4/2005 |
| JP | 2005-516210 | 6/2005 |
| JP | 2006-528780 | 12/2006 |
| JP | 2007-509351 | 4/2007 |

OTHER PUBLICATIONS

Song Peng and G. Michael Morris "Resonant scattering from two-dimensional gratings," J. Opt. Soc. Am. A, vol. 13, No. 5, May 1996, pp. 993-1006.

David Rosenblatt et al., "Resonant Grating Waveguide Structures," IEEE J. Quantum Electronics, vol. 33, No. 11, Nov. 1997, pp. 2038-2059.

Po Ki Yuen, et al., Self-referencing a single waveguide grating sensor in a micron-sized deep flow chamber for label-free biomolecular binding assays, Lab Chip, Jul. 2005, vol. 5, pp. 959-965. See Abstract, pp. 959-962.

X. G. Tian and X. M. Tao, Torsion Measurement Using Fiber Bragg Grating Sensors, Experimental Mechanics, Sep. 2001, vol. 41, No. 3, pp. 248-253. See Abstract, pp. 248-251.

\* cited by examiner

ANGLE SENSOR, SYSTEM AND METHOD EMPLOYING GUIDED-MODE RESONANCE

CROSS-REFERENCE TO RELATED APPLICATIONS

N/A

STATEMENT REGARDING FEDERALLY SPONSORED RESEARCH OR DEVELOPMENT

N/A

BACKGROUND

1. Technical Field

The invention relates to sensors. In particular, the invention relates to devices employed as angle sensors.

2. Description of Related Art

Angle sensors are employed in a wide variety of applications to determine and monitor angular orientation and motion. For example, angle sensors are commonly employed in control systems to monitor and control an orientation and/or motion of a particular element of the system. Applications that employ angle sensors range from spacecraft and satellite attitude/orientation control to orienting a substrate during manufacturing. As such, angle sensors and angle sensing are commonly found in devices and systems such as consumer electronics, automobiles, manufacturing equipment, navigation systems, and even communication systems (e.g., antenna position control).

In general, angle sensors and angle sensing may be divided into two categories: absolute angle sensors/sensing and relative angle sensors/sensing. Absolute angle sensors/sensing determine an absolute orientation (and often an absolute position) of an object. Examples of absolute angle or position sensors are inertial sensors that measure an acceleration of the object in an inertial reference frame. Relative angle sensors/sensing, on the other hand, determine a relative angle or orientation of the object relative to a reference object, angle or direction (e.g., reference angle). Optical angle sensors are often employed as relative angle sensors. Exemplary optical relative angle sensors typically employ laser interferometery and/or collimation of a reference optical signal.

Micro-electromechanical systems (MEMs) inertial position sensors have been demonstrated in angle sensing applications. Unfortunately, MEMs devices often can be prohibitively expensive to manufacture and deploy. Laser interferometery and collimated optical source-based angle sensing is similarly expensive and typically require stable (often extremely stable) operating conditions for accurate angle determination. Even very simple normal angle of incidence detectors based on corner reflectors can suffer from degradation and calibration drift over time due, in part, to changes in a surface condition of the reflectors due to environmental factors. Moreover, these technologies often present a problem during integration into an integrated circuit (IC) or during manufacturing when conventional fabrication technologies is desired.

BRIEF SUMMARY

In some embodiments of the present invention, an angle sensor is provided. The angle sensor comprises a guided-mode resonance (GMR) grating and a resonance processor. The resonance processor determines an angle of incidence of a signal incident on the GMR grating. The resonance processor determines the angle of incidence from a guided-mode resonance response of the GMR grating to the signal.

In other embodiments of the present invention, an angle sensing system is provided. The angle sensing system comprises an optical source that produces an optical signal. The angle sensing system further comprises a guided-mode resonance (GMR) grating. The GMR grating produces a guided-mode resonance response to the optical signal being incident on a surface of the GMR grating. The angle sensing system further comprises a resonance processor that determines an angle of incidence of the optical signal to the surface of the GMR grating using the guided-mode resonance response. The determined angle of incidence is one or both of stored and output by the angle sensing system.

In other embodiments of the present invention, a method of incident angle determination is provided. The method of incident angle determination comprises providing a guided-mode resonance (GMR) grating. The method of incident angle determination further comprises detecting a guided-mode resonance produced in the GMR grating when subjected to an incident signal. The method of incident angle determination further comprises determining an angle of incidence of the incident signal from one or both of a number of guided-mode resonances and a spectral distance between guided-mode resonances. The guided-mode resonances are present in a response of the GMR grating to the incident signal.

Certain embodiments of the present invention have other features that are one or both of in addition to and in lieu of the features described hereinabove. These and other features of the invention are detailed below with reference to the following drawings.

BRIEF DESCRIPTION OF THE DRAWINGS

The various features of embodiments of the present invention may be more readily understood with reference to the following detailed description taken in conjunction with the accompanying drawings, where like reference numerals designate like structural elements, and in which.

DETAILED DESCRIPTION

Figure 1:
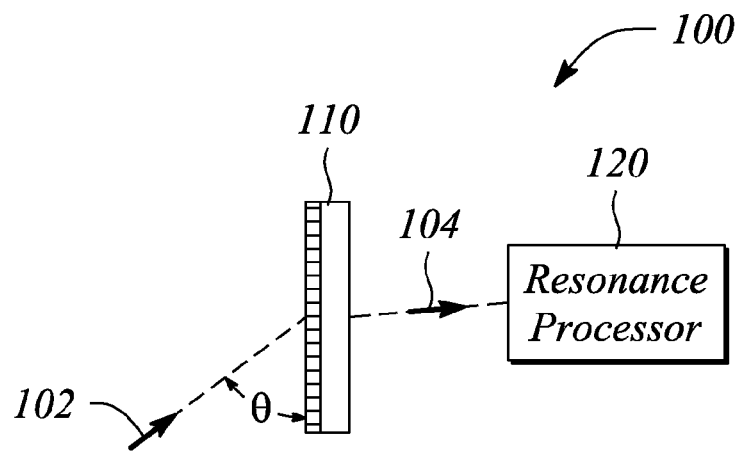
FIG. 1 illustrates a block diagram of an angle sensor according to an embodiment of the present invention.

Embodiments of the present invention facilitate one or both of determining an angle of incidence of a signal and determining an angular orientation of a planar surface relative to the incident signal. In particular, the planar surface is a surface of a guided-mode resonance (GMR) grating. A guided-mode resonance induced in the GMR grating by the signal is employed to determine the angle of incidence. The GMR-based angle determination embodiments of the present invention generally exhibit high sensitivity, high angular resolution and a large dynamic range. Moreover, the GMR-based angle determination embodiments are relatively unaffected by fluctuations in an intensity of the signal and one or both of may be relatively resilient to certain physical degradation of the planar surface and is capable of relatively high refresh rates (>1 MHz), for example. As such, GMR-based angle determination may be employed in a wide variety of operational environments and conditions as well as may find use in a myriad of applications.

The GMR grating employed in GMR-based angle determination may be integrated onto or into essentially any surface and generally utilizes a relatively small form factor or foot print on the surface. In particular, GMR gratings are fabricated using many conventional manufacturing methodologies including, but not limited to, microlithography/nanolithography-based surface patterning used in circuit fabrication. For example, conventional semiconductor manufacturing techniques (e.g., a CMOS compatible fabrication process) may be employed to create a GMR grating on a surface of an integrated circuit (IC). As such, an angle sensor employing the GMR-based angle determination of the various embodiments of the present invention may be readily integrated with conventional circuitry on an IC. Moreover, such an exemplary integrated angle sensor may be realized within a surface footprint as small as one square millimeter (mm), for example, using currently available manufacturing methods.

As used herein, a 'guided-mode resonance' is defined as an anomalous resonance excited in, and simultaneously extracted from, a waveguide by a phase-matching element such as a diffraction grating. An excitation signal or wave (e.g., light) incident on the diffraction grating is coupled into and is essentially, but generally temporarily, 'trapped' as energy in a resonance mode in the waveguide under some circumstances, such as certain combinations of angle of incidence and signal wavelength. The resonance mode may manifest as an excitation of surface waves (i.e., surface plasmon) on a surface of a metallic grating or as a resonant wave (e.g., guided-mode or quasi guided-mode) within a body of a dielectric layer of the waveguide, for example. The trapped energy may subsequently escape from the waveguide and combine one or both of constructively and destructively with either a signal reflected by the grating or a signal transmitted through the grating. Guided-mode resonances are also often referred to as 'leaky resonances'.

A 'guided-mode resonance (GMR) grating' as used herein is defined as any diffraction grating coupled with a waveguide that can support a guided-mode resonance. GMR gratings are also known and referred to as 'resonant grating waveguides' and 'dielectric waveguide gratings'. For example, an optical GMR grating may comprise a dielectric slab waveguide with a diffraction grating formed in or on a surface layer thereof. The diffraction grating may comprise grooves or ridges formed on a surface of the dielectric slab. In another example, the GMR grating is a planar dielectric sheet having a periodically alternating refractive index (e.g., phase grating) within the dielectric sheet. An exemplary phase grating may be formed by forming a periodic array of holes in and through the dielectric sheet. A signal incident on the surface of a GMR grating that excites a guided-mode resonance therein may be simultaneously extracted as one or both of a reflected signal (i.e., reflected waves) that reflects from an incident surface of the GMR grating or a transmitted signal (i.e., transmitted waves) that passes through the GMR grating and out a side of the GMR grating that is opposite the incident surface.

In various embodiments, the GMR grating may be either a 1-dimensional (1D) grating or a 2-dimensional grating. A 1D GMR grating may comprise a set of parallel and essentially straight grooves that are periodic only in a first direction (e.g., along an x-axis), for example. An example of a 2D GMR grating comprises an array of holes in a dielectric slab or sheet where the holes are periodically spaced along two orthogonal directions (e.g., along both an x-axis and a y-axis). A further discussion of GMR gratings and guided-mode resonance may be found, for example, in Magnusson et al., U.S. Pat. No. 5,216,680 and Wawro et al., U.S. Pat. No. 7,167,615, both of which are incorporated by reference in their entirety herein.

Among the characteristics of a GMR grating is an angular relationship between an angle of incidence of an incident wave and a response of the GMR grating. The response may be either a reflection response or a transmission response. Consider a 1D GMR grating comprising a relatively shallow or thin dielectric layer and having a grating period $\Lambda$. A planar wave-vector $\beta$ as a function of a free-space wavelength $\lambda$ of an incident wave for the 1D grating is given by a dispersion relation of equation (1).

$$\beta(\lambda) = n_{eff}(\lambda)\frac{2\pi}{\lambda} \quad (1)$$

where $n_{eff}(\lambda)$ is an effective refractive index of a guided mode of the grating. The effective refractive index $n_{eff}(\lambda)$ is a weighted average of refractive indexes of materials in which a guided-mode propagates within the 1D GMR grating. An interaction between quasi-guided modes of planar momentum within the 1D GMR grating and an incident wave (e.g., a beam of light) of wavelength $\lambda$ may be described in terms of an integer mode m by equation (2)

$$\beta_m(\lambda, \theta) = \frac{2\pi n}{\lambda}\sin(\theta) + \frac{2\pi m}{\Lambda} \quad (2)$$

where the incident wave is incident from a medium having a refractive index n and has an angle of incidence $\theta$ and where $\Lambda$ is the period of the 1D GMR grating. The interaction produces a guided-mode resonance response of the 1D GMR grating. The guided-mode resonance response is a function of both the wavelength $\lambda$ and the angle of incidence $\theta$ In some embodiments, the guided-mode resonance response is a reflection response while in other embodiments, the guided-mode response is a transmission response of the 1D GMR grating. Herein, the angle of incidence $\theta$ is defined as an angle between a principal incident direction of the incident wave and a plane parallel with a surface of the GMR grating.

For example, the incident wave may be an optical signal incident on a 1D optical GMR grating. Such an incident optical signal may give rise to a reflected optical response signal from a surface upon which the optical signal is incident. Alternatively, the incident optical signal may pass through the 1D optical GMR grating and exit from a side opposite the incident surface yielding a transmitted optical response signal. The angle of incidence is an angle measure between a plane parallel to the incident surface and a direction from with the optical signal arrives at the 1D optical GMR grating.

The guided-mode resonance response may be detected as spectral features (e.g., peaks in the spectrum) within a spectrum of either the reflection response or the transmission response (e.g., optical reflection/transmission spectra). In particular, the spectral features for a particular integer mode m are located at wavelengths $\lambda_m$ within the reflection/transmission spectra that satisfy a relation $\beta_{\text{eff}}(\lambda)=|\beta_m(\lambda,\theta)|$, given by equation (3).

$$\lambda_m^\pm = \frac{\Lambda}{m}[n_{\text{eff}} \pm n\sin(\theta)] \quad (3)$$

From equation (3) it is clear that the spectral features for an m-th mode occur in pairs that are separated by a spectral distance $\Delta\lambda_m$ that is a function of incident angle $\theta$ given by equation (4).

$$\Delta\lambda_m(\theta) = 2n\frac{\Lambda}{m}\sin(\theta) \quad (4)$$

From equation (4) it is clear that for a normal angle of incidence (i.e., $\theta=90$ degrees) the spectral distance equals zero indicating that there is just one guided-mode resonance. Moreover, it is clear from equation (4) that the spectral distance $\Delta\lambda_m$ is independent of an absolute spectral position of the resonance as well as an intensity or amplitude of the incident wave. In fact, for a given grating period $\Lambda$, a resonance splitting occurs that results in the spectral distance $\Delta\lambda_m$ between spectral features that is only a function of the angle of incidence $\theta$, the refractive index of the incidence medium n, and a mode order m.

Notably, the spectral distance $\Delta\lambda_m$ is independent of the physical composition of the grating (e.g., grating type and effective refractive index $n_{\text{eff}}$ of the grating). For example, an oxidation of a surface of the GMR grating does not affect a measured spectral distance $\Delta\lambda_m$ for the oxidized surface relative to an un-oxidized surface. As such, calibration of the grating as an angle sensor is not affected by a change in a composition of grating layers.

For simplicity herein, no distinction is made between a substrate or slab and any layer or structure on the substrate/slab unless such a distinction is necessary for proper understanding. Likewise, all diffraction gratings are referred to generically unless a distinction is necessary for proper understanding. Further, as used herein, the article 'a' is intended to have its ordinary meaning in the patent arts, namely 'one or more'. For example, 'a layer' generally means one or more layers and as such, 'the layer' means 'the layer(s)' herein. Also, any reference herein to 'top', 'bottom', 'upper', 'lower', 'up', 'down', 'left' or 'right' is not intended to be a limitation herein. Moreover, examples herein are intended to be illustrative only and are presented for discussion purposes and not by way of limitation.

FIG. 1 illustrates block diagram of an angle sensor 100 according to an embodiment of the present invention. The angle sensor 100 determines an angle of incidence of a signal 102. The angle sensor 100 determines the angle of incidence as an angle measured from a surface plane of the angle sensor 100 to a direction of arrival of the signal 102. In various embodiments, the signal 102 may be a broadband signal (e.g., white light) or a frequency-scanned narrowband signal 102 (e.g., frequency scanned, monochromatic light).

In general, the signal 102 is scanned or swept over a range of frequencies as a function of time. For example, the signal 102 may comprise an optical signal 102 from an optical source (not illustrated in FIG. 1) where the optical signal 102 is a broadband signal 102 such as, but not limited to, white light, for example. In another example, an optical signal 102 may be produced by a scanning continuous-wave laser that yields a frequency-scanned optical signal 102 as a function of time. In some embodiments, the signal 102 may be collimated (e.g., a collimated optical signal). In some embodiments, the optical signal 102 may be polarized (e.g., a polarized optical signal).

The angle sensor 100 comprises a guided-mode resonance (GMR) grating 110. In general, the GMR grating 110 may be any grating capable of supporting a guided-mode resonance. In some embodiments, the GMR grating 110 is a planar diffraction grating coupled to a planar dielectric waveguide (e.g., dielectric slab or sheet). The surface from which the angle of incidence measured is a planar surface of the GMR grating 110 that typically includes the diffraction grating.

Figure 2A:
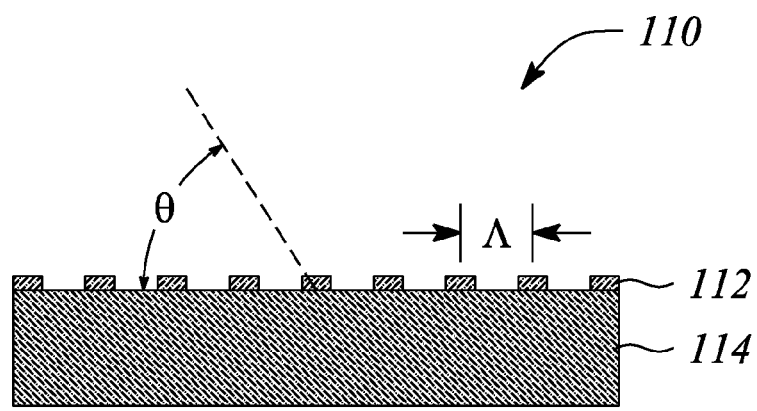
FIG. 2A illustrates a cross sectional view of a one dimensional (1D) GMR grating according to an embodiment of the present invention.

In some embodiments, the GMR grating 110 comprises a 1D diffraction grating of grating period $\Lambda$. Such embodiments are termed a '1D GMR grating' herein. FIG. 2A illustrates a cross sectional view of a 1D GMR grating 110 according to an embodiment of the present invention. As illustrated, the 1D GMR grating 110 comprises a diffraction grating 112 formed on a top surface layer of a dielectric slab or layer 114. The diffraction grating 112 may be formed as periodically spaced apart grating elements that may be one or both of ridges and grooves with the grating period $\Lambda$, for example. The grating elements may be formed mechanically by molding or etching, for example. Alternatively, the grating elements may be formed by depositing and patterning another material (e.g., a dielectric or a metal) on a surface of the dielectric slab 114.

Figure 2B:
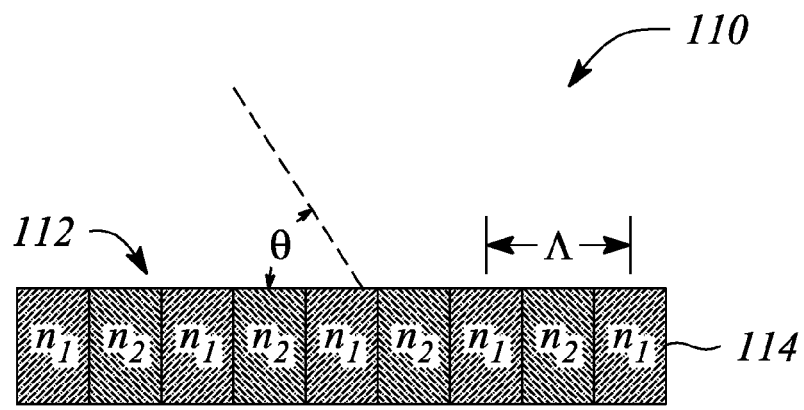
FIG. 2B illustrates a cross section of a 1D GMR grating according to another embodiment of the present invention.

FIG. 2B illustrates a cross section of a 1D GMR grating 110 according to another embodiment of the present invention. As illustrated in FIG. 2B, the diffraction grating 112 of the 1D GMR grating 110 comprises periodically alternating strips of a first dielectric material and a second dielectric material within the dielectric slab 114. The strips are periodically spaced apart at the grating period $\Lambda$ and are essentially parallel to one another. In some embodiments, a width measured in a direction of the grating period $\Lambda$ (i.e., in a direction of alternation of the strips) is essentially the same from one strip to the next. A refractive index $n_1$ of the first dielectric material differs from a refractive index $n_2$ of the second dielectric material, which results in a periodically alternating refractive index along the direction of the grating period $\Lambda$. The periodically alternating refractive indices produce the diffraction grating 112 within the dielectric slab 114.

In the 1D GMR grating 110, the angle of incidence is determined essentially orthogonal to the grating period $\Lambda$ of the diffraction grating 112 (e.g., orthogonal to the ridges, grooves, or dielectric strips). As such, the angle sensor 100 comprising a 1D GMR grating 110 may be used to determine an angle of incidence of a signal 102 relative to a single direction or axis (e.g., x-axis). To measure an angle of incidence relative to a second, typically orthogonal, direction or axis, a second 1D GMR grating-based angle-sensor 100 may be employed. For example, two 1D GMR grating-based angle sensors 100 oriented orthogonal to one another along principal axes of a coordinate system (e.g., x-axis and y-axis of a Cartesian coordinate system) may be employed to determine an arbitrary angle of incidence in a $2\pi$-steradian half space above a plane containing the angle sensors 100.

Figure 3:
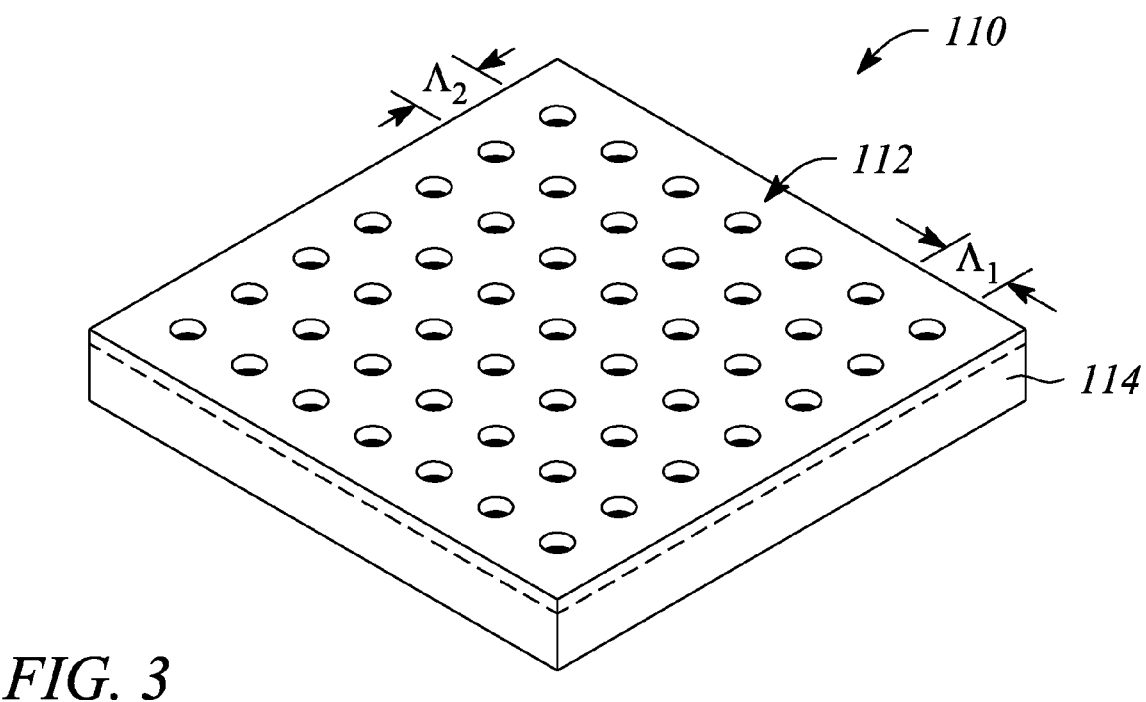
FIG. 3 illustrates a perspective view of a two dimensional (2D) GMR grating according to an embodiment of the present invention.

In other embodiments, the GMR grating 110 comprises a 2D diffraction grating and is referred to herein as a 2D GMR grating 110. FIG. 3 illustrates a perspective view of a 2D GMR grating 110 according to an embodiment of the present invention. As illustrated, diffraction grating 112 of the 2D GMR grating 110 comprises a 2D periodic array of holes formed in a surface layer of the dielectric slab 114. The 2D periodic array of holes has a 2-dimensional period $\Lambda$ that introduces a periodically repeating refractive index discontinuity in the surface layer of the dielectric slab 114. The periodically repeating refractive index discontinuity produces the diffraction grating 112.

For example, the dielectric slab 114 may comprises a silicon on insulator (SOI) wafer and the diffraction grating 112 may comprise a square lattice of holes etched in a surface of the silicon (Si). In this example, the holes may have a diameter of about 400 nanometers (nm) and be etched to a depth of about 25 nm. A spacing between, or period $\Lambda$ of, the holes in the square lattice may be about 1.05 micron ($\mu$m) (i.e., where $\Lambda=\Lambda_1=\Lambda_2$). In this example, the Si may be a layer having a thickness of about 50 nm.

While illustrated in FIG. 3 as holes, the 2D diffraction grating 112 may be produced by essentially any means for introducing a 2D periodically repeating discontinuity. For example, the holes described above may be filled with a dielectric material of a different refractive index than that of the dielectric slab 114. In another example, the 2D diffraction grating is provided by holes or filled holes (e.g., dielectric plugs) that extend completely through an entire thickness of the dielectric slab 114. In yet another example, an array of protruding surface features (e.g., bumps) may be employed as the 2D diffraction grating. In some embodiments, a grating period $\Lambda_1$ of the 2D diffraction grating 112 may be different in a first direction (e.g., x-axis) of the periodic array from a grating period $\Lambda_2$ in a second direction (e.g., y-axis) of the periodic array.

Referring again to FIG. 1, the angle sensor 100 further comprises a resonance processor 120. The resonance processor 120 determines the angle of incidence from a guided mode resonance response 104 of the GMR grating 110 to the signal 102. In particular, the resonance processor 120 extracts information from the guided-mode resonance response 104 and employs the extracted information to determine the angle of incidence. In some embodiments, the resonance processor 120 extracts the information from a response signal 104 related to the guided-mode resonance response 104 produced by the GMR grating 110.

For example, the response signal 104 is produced by an interaction between the incident signal 102 and the guided-modes of the GMR grating 110. In some embodiments, the response signal 104 may be a transmission response signal 104 as illustrated in FIG. 1. When a transmission response signal 104 is employed, the resonance processor 120 (or a detector portion thereof) may be located on a side of the GMR grating 110 opposite a side upon which the signal is incident. Alternatively, the response signal 104 may be a reflection response signal (not illustrated). With a reflected response signal 104, the resonance processor 120 (or a detector portion thereof) is generally located facing the incident side of the GMR grating 110. In some embodiments, both transmission response and reflection response signals 104 are employed, such that the resonance processor 120 comprises transmission and reflection receiving components.

In some embodiments, the resonance processor 120 determines the angle of incidence from a spectral distance between a pair of guided-mode resonances. In such embodiments, the determined angle of incidence is proportional to the spectral distance. The spectral distance is a distance within a spectrum of the guided-mode resonance response 104. For example, the spectral distance may be a frequency difference, or equivalently a wavelength difference, between a location of a first resonance and a location of a second resonance of a pair of resonances within a spectrum of a response signal 104 from the GMR grating 110.

In other embodiments, the resonance processor 120 determines the angle of incidence by counting resonances in the guided-mode resonance response 104. In particular, when a single resonance is counted by the resonance processor 120, the angle of incidence is determined to be normal (e.g., 90 degrees) to the GMR grating 110. If more than one resonance is counted by the resonance processor 120, the angle of incidence is determined by the resonance processor 120 to be less than 90 degrees. In some embodiments, when the resonance processor 120 counts more than one resonance, a spectral distance is then employed by the resonance processor 120 to determine the angle of incidence. Herein, a 'normal angle of incidence' is defined as the incident angle $\theta=90$ degrees.

In some embodiments, the resonance processor 120 may comprise a spectrum analyzer. The spectrum analyzer generates a spectrum of a response signal 104 produced by the GMR grating 110. In particular, the spectrum analyzer may generate a spectrum from a response signal 104 produced by a broadband (multi-frequency) incident signal 102. Functions of the spectrum analyzer such as, but not limited to a peak detector, may be employed to identify guided-mode resonances. Once identified, the guided-mode resonance may be counted and/or a spectral distance between the resonances may be determined. Many spectrum analyzers provide functions to measure a spectral distance, for example. From the spectral distance (or the count) the angle of incidence may be determined as described above.

In other embodiments, the resonance processor 120 comprises a signal detector (e.g., an optical detector). The signal detector receives the response signal 104 produced by the GMR grating 110. In such embodiments, the resonance processor 120 further comprises a power meter. The power meter measures a power level output by the signal detector, the power level being proportional to a magnitude of the response signal 104. Such embodiments of the resonance processor 120 may be employed when the incident signal 102 comprises a frequency-scanned narrowband signal 102, for example. The angle of incidence is determined one of by counting a number of the peaks in the measured power level or by measuring a time-distance between a pair of peaks in the measured power level.

For example, the resonance processor 120 may comprise a CMOS or CCD sensor that receives a response signal 104 from the GMR grating 110. In another example, the resonance processor 120 may comprise an array of wavelength-sensitive micro-sensors. The exemplary resonance processor 120 may further comprise an application specific integrated circuit (ASIC) that implements a peak-finder or another pattern-recognition algorithm to identify and extract resonance information from an output of the sensor(s). The ASIC may further compute the angle of incidence from the extracted resonance information.

Figure 4:
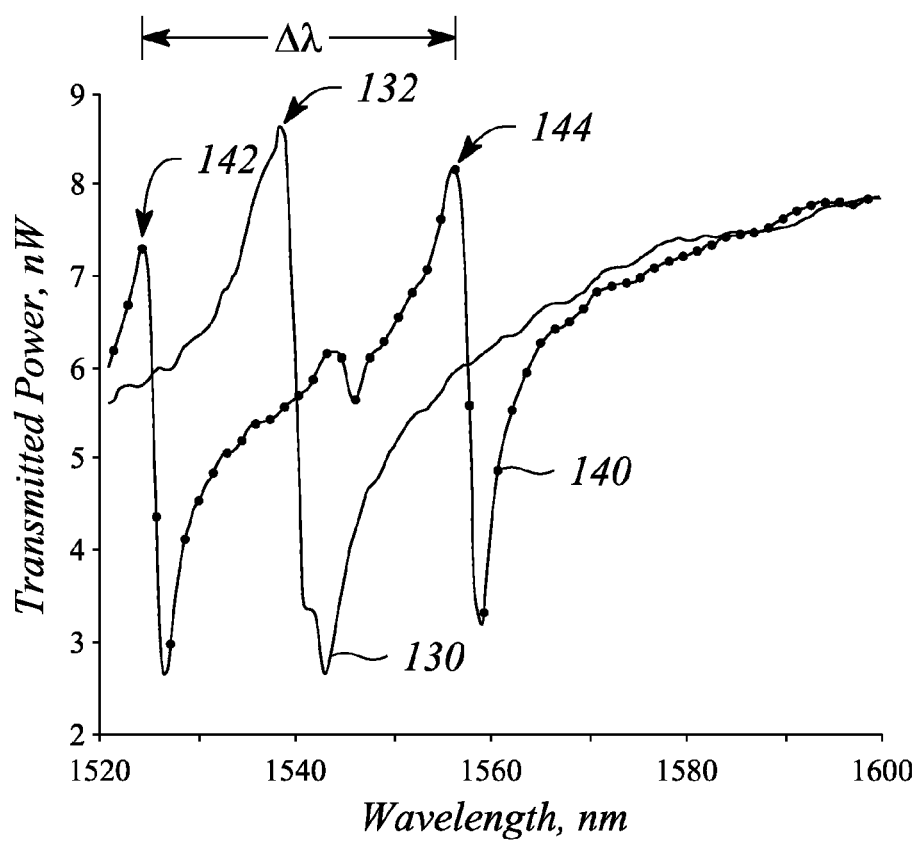
FIG. 4 illustrates a graph of exemplary spectra of a guided-mode resonance associated with the angle sensor of FIG. 1.

FIG. 4 illustrates a graph of exemplary spectra of a guided-mode resonance associated with the angle sensor 100 of FIG. 1. In particular, a first illustrated spectrum 130 depicts a typical spectrum of a response signal 104 produced by an optical GMR grating 110 when illuminated at a normal angle of incidence ($\theta=0$ degrees). At normal incidence, a single guided-mode resonance is produced as indicated by a single peak 132 present in the spectrum 130. A second illustrated spectrum 140 in FIG. 4 depicts a typical spectrum of an optical GMR grating 110 illuminated at an angle of incidence $\theta$. The spectrum 140 comprises two peaks 142, 144. A relative spectral distance $\Delta\lambda$ between the two peaks 142, 144 is proportional to the angle of incidence $\theta$.

In general, for a given angle of incidence and a particular structure (e.g., period $\Lambda$) of a GMR grating 110, there may be more than two guided-mode resonances that, in turn, produce more than two peaks in the spectrum. However, an angle of incidence may be determined by a relative spacing between a pair of the peaks when there are more than two peaks. For example, a relative spectral distance between a first two peaks closest to a mid point of the spectrum may be employed. The mid point of the spectrum is a point at which a single peak would occur for a normal angle of incidence of the incident signal 102. Also, while described herein as a spectral peak, other spectral features indicative of a guided-mode resonance in the GMR grating 110 may be employed to identify and locate a resonance. For example, one or more of a valley in the spectrum, a zero crossing relative to an average level of the spectrum, and an inflection point in the spectrum may also be employed.

Figure 5:
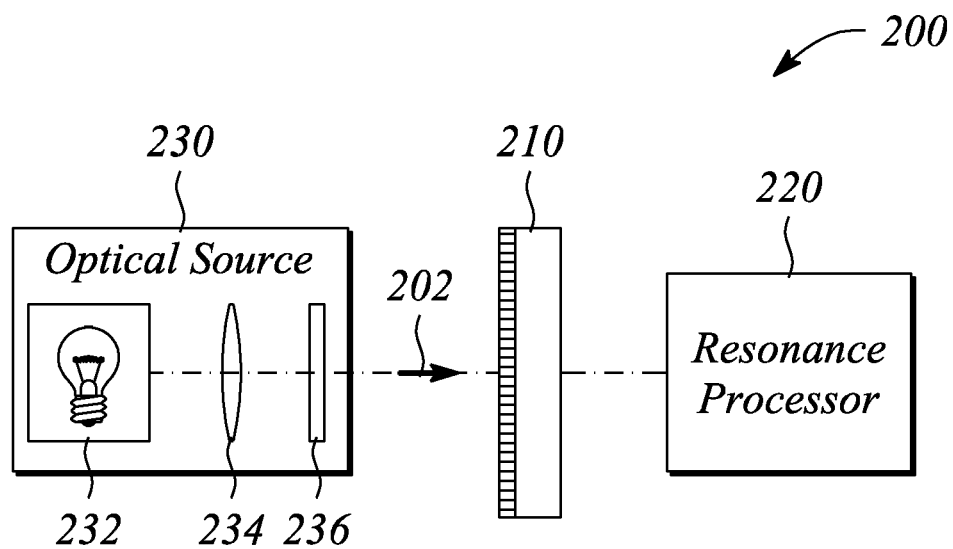
FIG. 5 illustrates a block diagram of an angle sensing system according to an embodiment of the present invention.

FIG. 5 illustrates a block diagram of an angle sensing system 200 according to an embodiment of the present invention. As illustrated, the angle sensing system 200 employs an optical signal 202 and therefore, is a photonic or optical angle sensing system 200 in this embodiment. In other embodiments, the optical components are replaced for components adapted for a non-optical type signal, such that the angle sensing system 200 may be considered a general angle sensing system (not illustrated). The angle sensing system 200 outputs a determined angle of incidence of the optical signal 202.

The angle sensing system 200 comprises a guided-mode resonance (GMR) grating 210. The GMR grating 210 produces a guided-mode resonance response as a result of an interaction with the optical signal 202 incident on a surface of the GMR grating 210. In some embodiments, the GMR grating 210 is essentially similar to the GMR grating 110 described above with respect to the angle sensor 100.

The angle sensing system 200 further comprises a resonance processor 220. The resonance processor 220 determines an angle of incidence of the optical signal 202 on the surface of the GMR grating 210. The resonance processor 220 employs the guided-mode resonance response to make the angle determination. In some embodiments, the resonance processor 220 is essentially similar to the resonance processor 120 described above with respect to the angle sensor 100.

The angle sensing system 200 further comprises an optical source 230. The optical source 230 produces the optical signal 202. In some embodiments, the optical source 230 is a broadband optical source 230 that produces a broadband optical signal 202 (e.g., white light). In other embodiments, the optical source 230 is a scanned narrowband optical source 230 that produces a narrowband optical signal 202 that is time-scanned in frequency. For example, the narrowband optical source 230 may be a monochromatic scanning continuous-wave laser 230. The optical source 230 comprises an optical emitter 232 that emits the optical signal 202. While illustrated by way of example herein as employing an optical signal 202 from an optical source 230, the angle sensing system 200 generally may be implemented with essentially any signal source 230 that generates a wave that may act as the signal 202.

In some embodiments, the optical signal source 230 is a collimated optical source 230 that produces a collimated optical signal 202. For example, the optical source 230 may further comprise a collimator 234 (e.g., a lens or a pin hole). The collimator 234 is located between the optical source 230 and the GMR grating 210 and acts to collimate the optical signal 202 passing through the collimator 234. In some embodiments, the optical source 230 further comprises a polarizer 236. The polarizer 236 is also generally located between the optical source 230 and the GMR grating 210. The polarizer 236 converts the optical signal 202 passing therethrough into a polarized optical signal 202 (e.g., linearly polarized optical signal).

While illustrated, by way of example, as employing an optical signal 202 from an optical source 230, the angle sensing system 200 generally may comprise essentially any signal source 230 that generates a directional 'wave-containing' signal 202 (e.g., a radio frequency signal, a microwave signal, or an acoustic signal). In such a general implementation, the optical GMR grating 210 and resonance processor 220 described above would similarly be replaced by a GMR grating 210 and resonance processor 220 that were compatible with the wave-containing signal 202 and a resonance response produced thereby.

Figure 6:
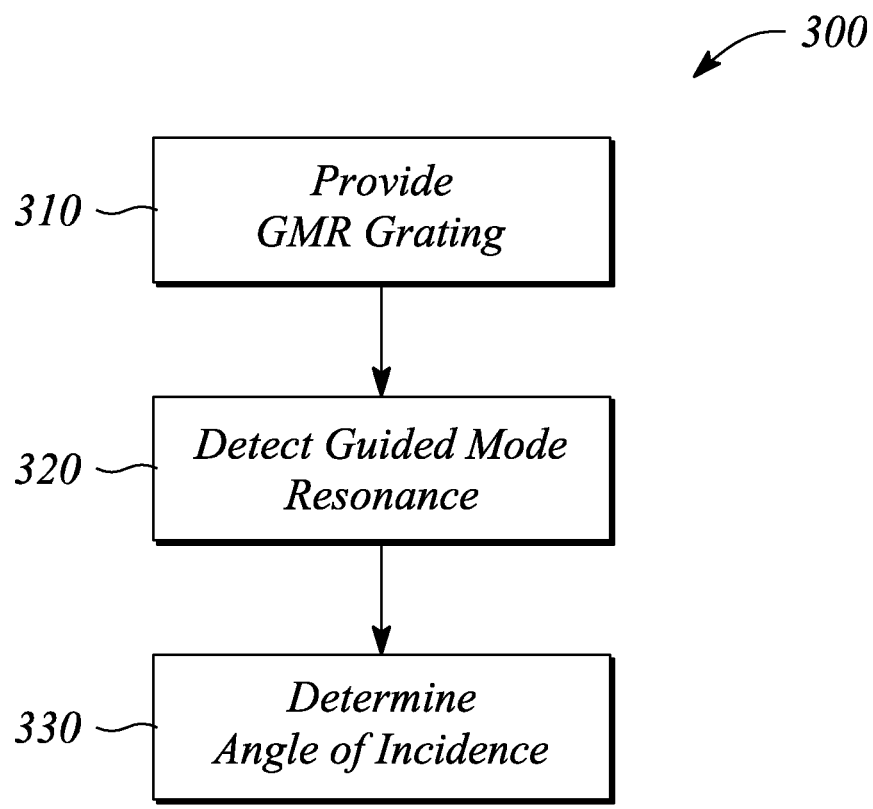
FIG. 6 illustrates a flow chart of a method of incidence angle determination according to an embodiment of the present invention.

FIG. 6 illustrates a flow chart of a method 300 of incidence angle determination according to an embodiment of the present invention. The method 300 of incidence angle determination comprises providing 310 a guided-mode resonance (GMR) grating. For example, the provided 310 GMR grating may be a 1D GMR grating. In another example, the provided 310 GMR grating is a 2D GMR grating. In some embodiments, the provided 310 GMR grating is essentially similar to the GMR grating 110 described above with respect to the angle sensor 100.

The method 300 of incidence angle determination further comprises detecting 320 a guided-mode resonance produced in the GMR grating when subjected to an incident signal. For example, the incident signal may be an optical signal incident on a surface of the GMR grating. The incident optical signal may be one of a broadband optical signal and a time-scanned narrowband optical signal, for example. In some embodiments, detecting 320 a guided-mode resonance may comprise detecting a response signal produced by the GMR grating from the incident signal. In various embodiments, the response signal may be one or more of a transmitted response signal and a reflected response signal.

The method 300 of incidence angle determination further comprises determining 330 an angle of incidence of the incident signal. The angle of incidence is determined 330 from one or both of a number of guided-mode resonances and a spectral distance between guided-mode resonances present in a response of the GMR grating to the incident signal. In some embodiments, the determined 330 angle of incidence is proportional to the spectral distance between a pair of guided-mode resonances when more than one guided-mode resonance is present. In other embodiments, the angle of incidence is determined to be normal to the surface of the GMR grating when only one guided-mode resonance is present in the response of the GMR grating to the incident signal.

In some embodiments, determining 330 an angle of incidence comprises measuring a spectrum of a response signal from the GMR grating. Determining 330 further comprises identifying a spectral feature in the spectrum associated with the guided-mode resonance produced in the GMR grating. For example, the identified spectral feature may be a peak in the spectrum. Determining 330 further comprises one or both of counting a number (i.e., quantity) of the identified spectral feature and measuring a spectral distance between a pair of identified spectral features. As provided above, the angle of incidence is determined 330 to be normal to the surface of the GMR grating when there is only one identified spectral feature. The angle of incidence is determined 330 to be proportional to the spectral distance when there is more than one identified spectral feature.

Thus, there have been described embodiments of an angle sensor, an angle sensing system and a method of incident angle determination using a guided-mode resonance. It should be understood that the above-described embodiments are merely illustrative of some of the many specific embodiments that represent the principles of the present invention. Clearly, those skilled in the art can readily devise numerous other arrangements without departing from the scope of the present invention as defined by the following claims.

What is claimed is:

1. An angle sensor comprising:
   a guided-mode resonance (GMR) grating; and
   a resonance processor to determine an angle of incidence of a signal incident on the GMR grating from a guided-mode resonance response of the GMR grating to the signal one or both of:
     from a spectral distance between a pair of guided-mode resonances in the guided-mode resonance response, the determined angle of incidence being proportional to the spectral distance, and
     by counting resonances in the guided-mode resonance response, wherein a count of one resonance equals an angle of incidence that is a normal angle of incidence relative to a surface of the GMR grating.

2. The angle sensor of claim 1, wherein the GMR grating comprises a two-dimensional grating, the determined angle of incidence being an angle measured relative to a planar surface of the two-dimensional grating.

3. The angle sensor of claim 2, wherein the two-dimensional grating comprises a two-dimensional periodic array of dielectric features formed in a surface layer of a dielectric slab.

4. The angle sensor of claim 3, wherein the dielectric features comprise holes in the surface layer.

5. The angle sensor of claim 1, wherein the GMR grating comprises a surface profile of a dielectric slab, the surface profile comprising an array of surface features protruding from a surface of a dielectric slab.

6. The angle sensor of claim 1, wherein the signal is a broadband optical signal, and wherein the resonance processor comprises:
   a spectrum analyzer that generates a spectrum of a response signal produced by the GMR grating, the response signal being the guided-mode resonance response.

7. The angle sensor of claim 6, wherein the resonance processor further comprises:
   a peak detector that detects peaks in the spectrum,
   wherein the angle of incidence is determined comprising one or both of counting a number of the detected peaks and measuring a spectral distance between a pair of detected peaks.

8. The angle sensor of claim 1, wherein the signal is a scanned narrowband optical signal, and wherein the resonance processor comprises:
   an optical detector that receives a response signal produced by the GMR grating as the guided-mode resonance response; and
   a power meter that measures a power level output by the optical detector, the power level being proportional to a magnitude of the response signal,
   wherein the narrowband optical signal is frequency-scanned across a range of optical frequencies as function of time, the angle of incidence being determined one or both of by counting a number of peaks in the measured power level and by measuring a time-distance between a pair of peaks in the measured power level.

9. The angle sensor of claim 1, wherein the resonance processor receives and processes a response signal from the GMR grating, the response signal being a transmitted response signal of the GMR grating.

10. The angle sensor of claim 1, wherein the resonance processor receives and processes a response signal from the GMR grating, the response signal being a reflected signal of the GMR grating.

11. An angle sensing system comprising:
    an optical source that produces an optical signal;
    a guided-mode resonance (GMR) grating, the GMR grating producing a guided-mode resonance response to the optical signal being incident on a surface of the GMR grating; and
    a resonance processor to determine an angle of incidence of the optical signal to the surface of the GMR grating using the guided-mode resonance response one or both of:
      from a spectral distance between a pair of guided-mode resonances in the guided-mode resonance response, the determined angle of incidence being proportional to the spectral distance, and
      by counting resonances in the guided-mode resonance response, wherein a count of one resonance equals an angle of incidence that is a normal angle of incidence relative to a surface of the GMR grating,
    wherein the determined angle of incidence is one or both of stored and output by the angle sensing system.

12. The angle sensing system of claim 11, wherein the resonance processor comprises a spectrum analyzer to determine a spectral distance between a pair of resonant features in a spectrum of the guided-mode resonance response, the resonant features corresponding to guided-mode resonances in the guided-mode resonance response.

13. The angle sensing system of claim 11, wherein the optical signal produced by the optical source is one of a broadband optical signal and a narrowband optical signal that is time-scanned in frequency, and wherein the optical source further comprises a polarizer that linearly polarizes the optical signal.

14. The angle sensing system of claim 11, wherein the GMR grating comprises a silicon on insulator (SOI) wafer with a square lattice of holes etched in a surface of the silicon.

15. The angle sensing system of claim 11, wherein the GMR grating is a one-dimensional GMR grating.

16. A method of incident angle determination, the method comprising:
    providing a guided-mode resonance (GMR) grating;
    detecting a guided-mode resonance produced in the GMR grating when subjected to an incident signal; and
    determining an angle of incidence of the incident signal from one or both of a number of guided-mode resonances and a spectral distance between guided-mode resonances, the guided-mode resonances being present in a response of the GMR grating to the incident signal.

17. The method of incident angle determination of claim 16, wherein the determined angle of incidence is proportional to the spectral distance between a pair of guided-mode resonances when more than one guided-mode resonance is present, the determined angle of incidence being a normal angle of incidence relative to a surface of the GMR grating when only one guided-mode resonance is present.

18. The method of incident angle determination of claim 16, wherein the incident signal is one of a broadband optical signal and a time-scanned narrowband optical signal.

19. The method of incident angle determination of claim 16, wherein determining the angle of incidence comprises:
   measuring a spectrum of a response signal from the GMR grating;
   identifying a spectral feature in the spectrum, the spectral feature being associated with the guided-mode resonance produced in the GMR grating; and
   one or both of counting a number of the identified spectral feature and measuring a spectral distance between a pair of identified spectral features,
   wherein the angle of incidence is determined to be a normal angle of incidence relative to a surface of the GMR grating when there is only one identified spectral feature counted, and
   wherein the angle of incidence is determined to be proportional to the spectral distance when there is more than one identified spectral feature counted.

* * * * *